Figure 1:
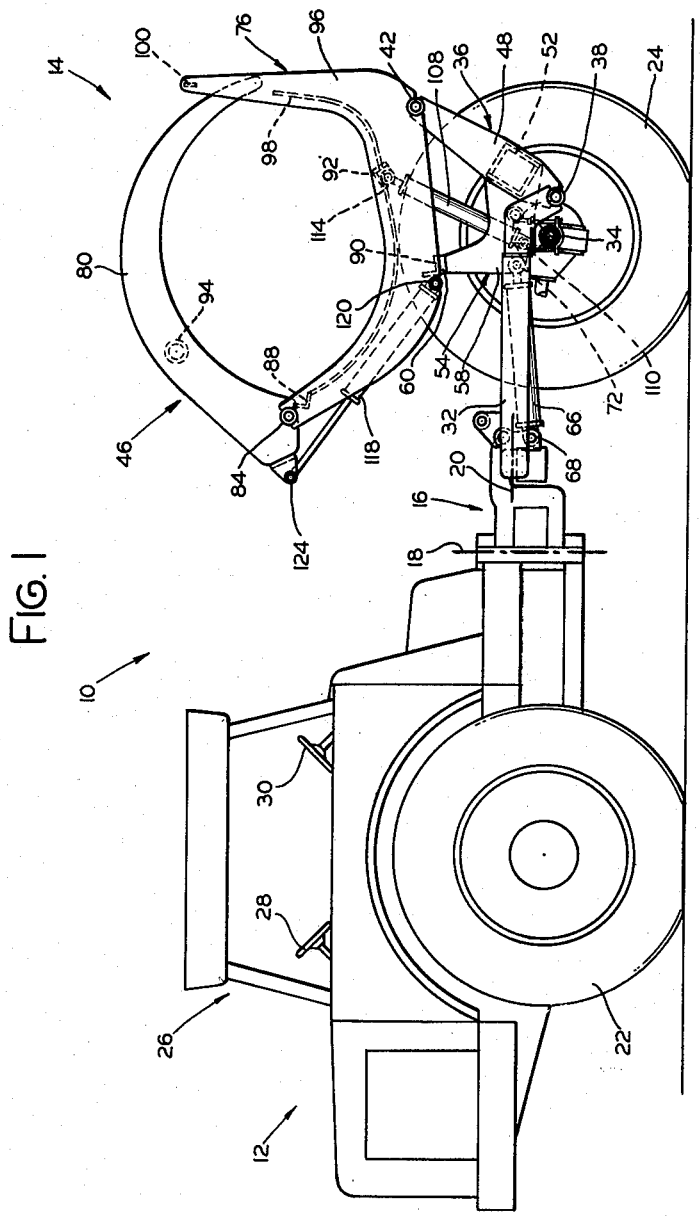

March 17, 1964

C. W. GUSTINE 3,125,234

MATERIAL HANDLING MACHINE

Filed Oct. 21, 1960

4 Sheets-Sheet 1

INVENTOR.
CHARLES W. GUSTINE
BY
Kenneth C. Witt
ATTORNEY

March 17, 1964
C. W. GUSTINE
3,125,234
MATERIAL HANDLING MACHINE
Filed Oct. 21, 1960
4 Sheets-Sheet 2
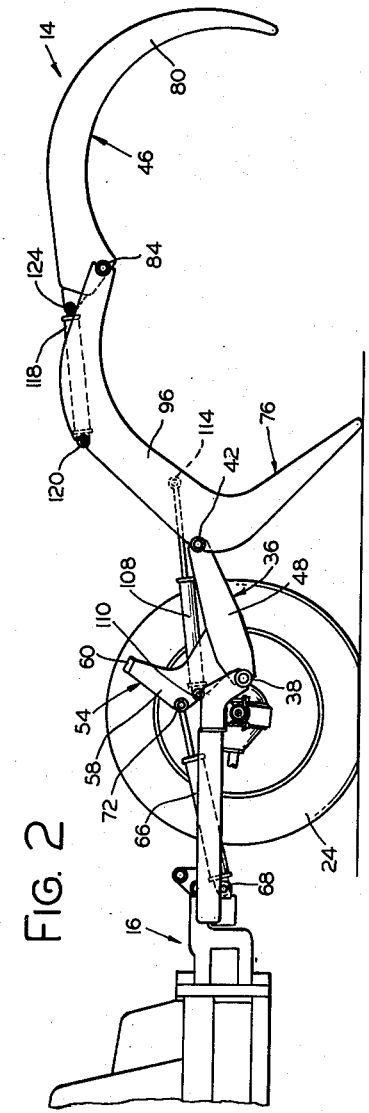
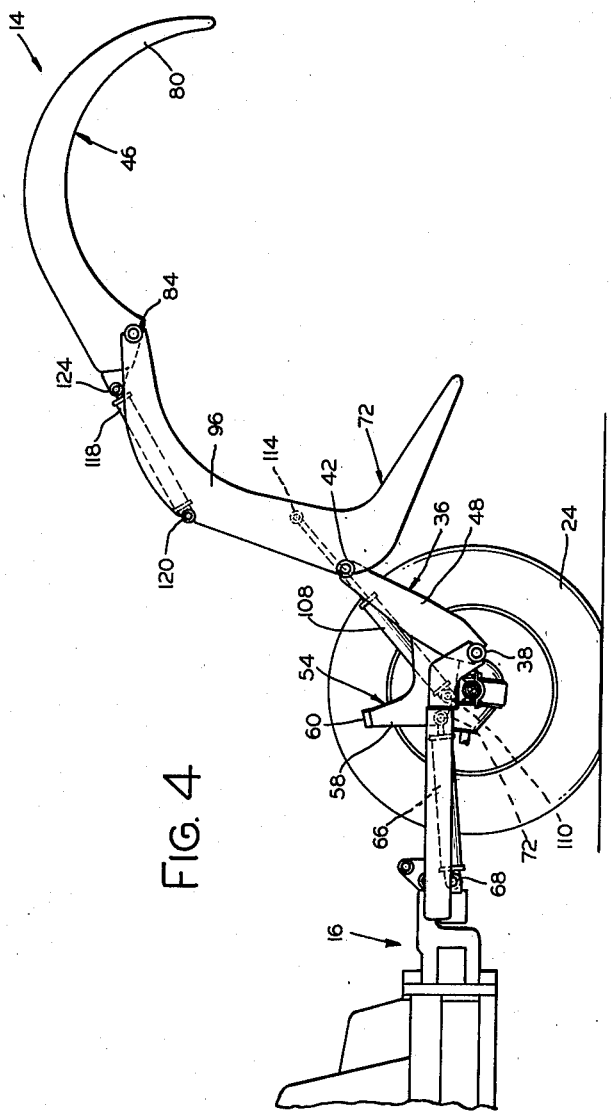
INVENTOR.
CHARLES W. GUSTINE
BY
Kenneth C. Witt
ATTORNEY March 17, 1964

C. W. GUSTINE 3,125,234

MATERIAL HANDLING MACHINE

Filed Oct. 21, 1960

4 Sheets-Sheet 3

INVENTOR.
CHARLES W. GUSTINE
BY
*Kenneth C. Witt*
ATTORNEY

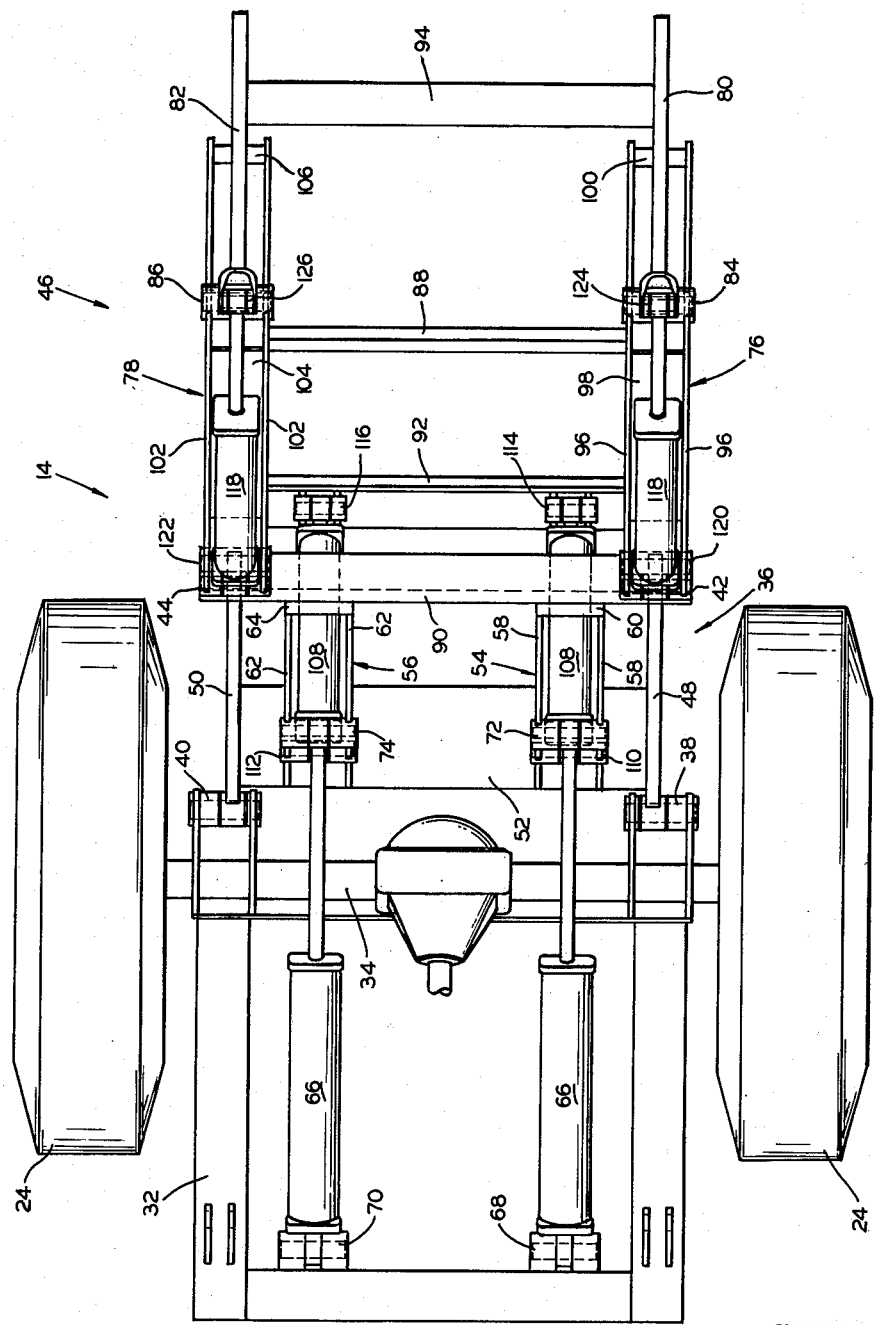

United States Patent Office 3,125,234
Patented Mar. 17, 1964

3,125,234
MATERIAL HANDLING MACHINE
Charles W. Gustine, St. Joseph, Mich., assignor to Clark Equipment Company, a corporation of Michigan
Filed Oct. 21, 1960, Ser. No. 64,066
6 Claims. (Cl. 214—508)

This invention relates to material handling machines, and more particularly to such machines which employ a grapple as the load engaging means.

One of the primary uses of my machine is in the handling of pulpwood and the like in connection with lumbering operations; however, it will be readily understood that the machine is not limited to such use but may be employed with equal facility in the handling of lengths of pipe and other elongated objects which lend themselves to handling by means of a grapple. The use of my machine in connection with the handling of pulpwood is described hereinafter in conjunction with a disclosure of a preferred embodiment of my invention.

A problem is presented by the necessity of finding economical and satisfactory means for transferring a pile of logs from the stump in the bush where the tree is felled, the branches stripped, and the tree bucked up into a pile, to the main haul roads. These piles are usually about ¾ to 1½ cords and consists of 4 foot or longer bolts stacked on parallel skids with a supporting stake at each end.

Numerous mechanical devices and machines have been conceived and used heretofore in connection with the above-mentioned problem of the handling of logs, pulpwood, and the like, in getting from the location where they are cut to a main haul road or track where they can be transported on a truck, railroad, or other convenient conveyance. However, none of the above devices and machines have been entirely satisfactory. For example, some of the machines cannot handle log lengths which are greater than 4 feet, while others have boom structures which require considerable clearance to operate. Therefore, it is one object of my invention to provide an improved means of handling pulpwood and the like in connection with lumbering operations.

Another object of the invention is to provide a vehicle which with a single operator is capable of going into the woods, picking up a load of logs, and transporting them out to a main road or track.

A further object of my invention is to provide a machine which can handle logs of greatly varying lengths without requiring any adjustment.

A still further object of my invention is to provide a machine which keeps the load being handled close to the wheels at all times, in order to keep the center of gravity of the machine and load as low as possible and thereby maintain maximum stability.

Other objects, features and advantages of my invention will be apparent from the subsequent description when taken in connection with the accompanying drawing of a preferred embodiment of the invention.

In carrying out my invention in one form, I provide a machine which includes a horizontally disposed frame portion carried on an axle and wheel assembly, a grapple support pivotally mounted on the frame and a grapple pivotally attached to the grapple support. There are three pairs of hydraulic actuators which serve respectively to pivot the grapple support about the frame, pivot the grapple about the grapple support and open and close the grapple. By proper actuation of the hydraulic actuators it is possible to engage a load with the grapple and then lift the load to a position immediately over the wheels in which position the load is transported. When it is desired to unload the load a procedure similar to the reverse of the loading procedure is carried out. The entire operation is explained in greater detail hereinafter in the detailed description.

Figure 3:
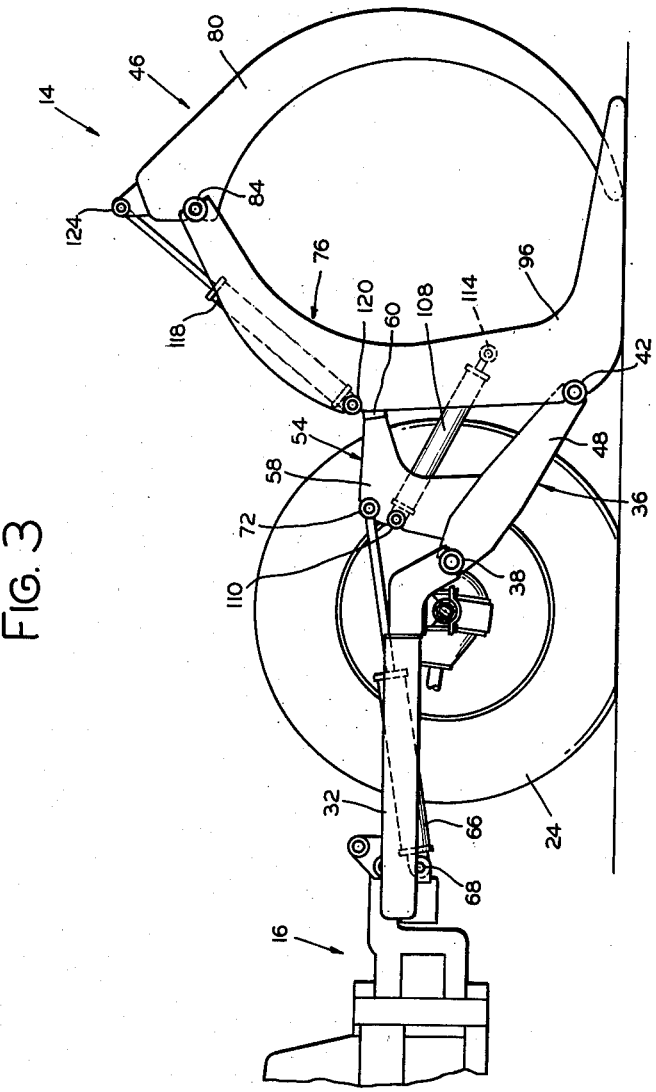

For a clearer and more complete understanding of my invention reference should be had to the accompanying drawing in which:

FIGURE 1 is a side elevation of a vehicle embodying a preferred form of my invention with the near rear wheel removed and the grapple in the carrying position, FIGURE 2 is a partial side elevation of the same vehicle with the grapple in the loading position, FIGURE 3 is a partial side elevation of the same vehicle with the grapple in the holding position, FIGURE 4 is a partial side elevation of the same vehicle with the grapple in an elevated unloading position, and FIGURE 5 is a partial top plan view of the same vehicle with the grapple in the holding position as illustrated in FIG. 3.

Referring to FIG. 1 of the drawing, the numeral 10 indicates generally the complete vehicle which is depicted in this figure. The vehicle includes a two-wheeled tractor portion 12 and a two-wheeled trailer portion 14 which is connected to tractor portion 12 by means of a combined draft and steering coupling 16. The coupling 16, which is of known type, provides for pivoting of trailer portion 14 with respect to tractor portion 12 about the vertically disposed axis 18 and also about the horizontally disposed axis 20. The vehicle is steered by pivoting the tractor 12 with respect to trailer 14 about axis 18 by a suitable power means, while the horizontal pivot connection about axis 20 permits the vehicle to negotiate very rough terrain without any of the four wheels leaving the ground.

The tractor portion 12 of the vehicle includes a suitable prime mover such as a diesel engine, for example, for propelling the vehicle and providing power for operating various power operated devices thereon. A power train of known type including a torque converter, if desired, a transmission, propeller shafts, differentials, and axle shafts is provided for operating the wheels 22 and 24 of the vehicle from the prime mover. Preferably, both the front wheels 22 (only one of which appears in the drawing) of the tractor and the rear wheels 24 of the trailer are driven wheels. An operator's station 26 is provided on the tractor portion 12 of the vehicle for operating the vehicle to pick up, transport and discharge loads. Preferably, two steering wheels 28 and 30 and dual sets of other controls are provided to facilitate operation of the vehicle in either direction, it being understood that while this machine is intended for operation by a single operator, it is advantageous for him to be able to face in either direction.

The trailer portion 14 of the vehicle includes a horizontally disposed frame portion 32 carried in part upon a transverse axle 34 having ground engaging wheels 24 at the ends thereof. A grapple support member 36 is pivotally mounted on the rear extremity of the frame portion 32 at points 38 and 40 which are located behind and slightly below the axle 34 and closely adjacent thereto. Pivotally mounted on the grapple support member 36 at points 42 and 44 is a load handling device or grapple 46.

Referring to FIGS. 1 and 5, the grapple support member 36 comprises a pair of short boom arms 48 and 50, a transverse brace member 52 and a pair of support arms 54 and 56. The boom arms 48 and 50 extend a short distance beyond the outer periphery of the wheels 24, in the form of the invention illustrated in the drawing, and are mounted closely adjacent the axle 34 at points 38 and 40 on the frame 32 in transversely spaced apart relationship. Consequently, regardless of the position of the boom arms 48 and 50, the points 42 and 44 are always closely adjacent the outer periphery of the wheels 24. The transverse brace member 52 is joined to the boom arms 48 and 50 intermediate their ends in a suitable manner such as by welding, thus fixedly locating the boom arms 48 and 50 in parallel relationship. The L-shaped support arms 54 and 56 are shorter than the boom arms and do not extend beyond the outer periphery of the wheels 24 in the form of the invention described and illustrated herein, except when the grapple support member 36 is actuated substantially to the position shown in FIGURE 3 when they extend a short distance past the outer periphery of the wheels 24. The support arms 54 and 56 are disposed inwardly of the boom arms 48 and 50 in transversely spaced apart relationship and are rigidly joined to the transverse brace member 52 in a suitable manner, such as by welding, at an angle to the boom arms 48 and 50 as viewed in FIG. 1. The support arm 54 comprises a pair of generally L-shaped plates 58 joined at one end to the brace member 52 and connected at the other end by a bearing plate 60. The support arm 56 similarly comprises a pair of plates 62 and a bearing plate 64.

The grapple support member 36 is moved between the upwardly disposed position of FIG. 1 and the rearwardly disposed position of FIG. 3 by suitable power means which, as illustrated, comprise a pair of piston and cylinder type hydraulic actuators 66. The hydraulic actuators 66 are pivotally connected at one end to frame 32 at locations 68 and 70 respectively, and at the other end to the support arms 54 and 56 at locations 72 and 74 respectively. As will be appreciated, actuation of the hydraulic actuators 66 to extend and retract will cause the grapple support member 36 to pivot between the positions shown in FIGS. 1 and 3.

The grapple 46 comprises a pair of generally U-shaped gripper arms 76 and 78 pivotally mounted in transversely spaced apart relationship on boom arms 48 and 50 at locations 42 and 44, respectively, and a pair of generally semi-circular gripper arms 80 and 82 pivotally mounted on the gripper arms 76 and 78 at locations 84 and 86, respectively, and coacting therewith to form a load handling device. Interconnecting the gripper arms 76 and 78 are three transverse brace members 88, 90 and 92. The brace member 90 also serves to abut the bearing plates 60 and 64, thereby providing a stop for the grapple. Also, the gripper arms 80 and 82 are interconnected by a cylindrical brace 94 which is joined to them in a suitable manner such as by welding, thereby forming a rigid gripper unit.

As will be noted, an extremely strong, yet lightweight, construction is utilized in the gripper arms 76 and 78 as compared to the single plate construction of the gripper arms 80 and 82. The stronger construction of gripper arms 76 and 78 is necessary because they must support the entire weight of the load when it is being transported, whereas the gripper arms 80 and 82 serve largely only to hold the load in place. The gripper arm 76 comprises a pair of U-shaped plates 96, a curved plate 98 which interconnects the plates 96 and is joined to them in a suitable manner such as by welding and another plate 100 which is similarly positioned and serves the same purpose as the plate 98. The gripper arm 78 is constructed similarly to a gripper arm 76 and comprises a pair of U-shaped plates 102, a curved plate 104 and another plate 106.

The grapple 46 is pivoted about the points 42 and 44 between the carrying position of FIG. 1 and the loading position of FIG. 2 by suitable power means which, as illustrated, comprise a pair of piston and cylinder-type hydraulic actuators 108 connected at their one ends to the support arms 54 and 56 at locations 110 and 112, respectively, and at their other ends to the gripper arms 76 and 78 at locations 114 and 116, respectively.

The coacting gripper arms 76, 80 and 78, 82 are pivoted between the closed position of FIG. 1 and the open position of FIG. 2 by suitable power means which, as illustrated, comprise a pair of piston and cylinder type hydraulic actuators 118 connected at one end to the gripper arms 76 and 78 at points 120 and 122, respectively, and at the other end to the gripper arms 80 and 82 at 124 and 126, respectively.

The operation of my material handling machine is illustrated by FIGS. 1 through 4. If it is desired to pick up a load of logs, assuming the grapple 46 is in the position shown in FIG. 1, actuators 66 and 108 are extended to move the grapple 46 rearwardly to the position shown in FIG. 2. Simultaneously, actuators 118 are operated to open the upper gripper arms 80 and 82.

When the position shown in FIG. 2 has been reached, the grapple 46 is in the loading position adjacent the load to be transported. The actuators 118 are now operated to close the gripper arms 80 and 82, thus gathering the logs within the grapple 46 between the gripper arms 80 and 82 and the gripper arms 76 and 78. Simultaneously, the actuators 108 are retracted and actuators 66 are further extended, thus moving the grapple 46 into the closed position shown in FIG. 3 with the load engaged and the grapple 46 abutting the support arms 54 and 56.

After the position of FIG. 3 has been reached, the actuators 66 are retracted thereby pivoting the grapple support member 36 along with the grapple 46 about points 38 and 40 into the position shown in FIG. 1. The load is now in position to be transported by the vehicle 10, and as will be noted, the grapple 46 is supported not only at the pivot points 42 and 44 but also at the points where the bearing plates 60 and 64 abut the transverse brace member 90.

The position illustrated in FIG. 4 is illustrative of a position which the machine can assume by suitable manipulation of the various actuators, in order to dump the load of logs or other items.

While I have omitted from FIGS. 1 through 5 of the drawing, for the sake of better perspicuity, the conduits which conduct fluid under pressure to operate the various actuators, it will be understood that these conduits are provided in the usual manner and are preferably supplied with fluid under pressure from a pump operated by the prime mover of vehicle 10. Suitable flexible sections of conventional construction are provided in the conduits to carry the fluid around movable joints in the machine.

At this point, it will be readily appreciated that I have disclosed a vehicle which enables a single operator to pick up, transport and unload quantities of logs or similar items. Further, it will be noted that the vehicle is adapted to handle loads of varying lengths since they are carried transversely just above the wheels. In actual practice, log lengths varying from 4 to 8 feet and over have been handled by this machine. It will be noted also that throughout the operation of this vehicle, the grapple 46 is in close relationship to the rear wheels 24, thereby requiring only minimum clearance for operation of the machine, reducing stresses in the machine during operation, and providing maximum stability for movement over rough terrain.

While I have described and illustrated herein a preferred embodiment of my invention, it will be understood that many modifications may be made in it. I intend to cover by the appended claims all such modifications which fall within the true spirit and scope of my invention.

I claim:

1. In a material handling machine having a horizontally disposed frame portion, a transverse axle connected to and supporting the frame and ground engaging means at the outer ends of the axle, a support member pivotally mounted on the frame closely adjacent the axle for movement between two operating positions, the said support member comprising boom arm means extending outwardly and terminating closely adjacent the outer periphery of the ground engaging means and support arm means extending outwardly at an angle to the said boom arm means and terminating adjacent the outer periphery of the ground engaging means, the said support arm means terminating within the said periphery when said support member is in one operating position and without the said periphery when said support member is in the other operating position, load engaging means pivotally mounted at the outer ends of the said boom arm means and adapted to be pivoted between one extreme position in which a portion of the load engaging means abuts the ends of the said support arm means and another position, first power means connected between said load engaging means and said support member for pivoting the load engaging means selectively between the said two positions, and second power means connected between the said support member and the frame for moving the said support member selectively between the said two operating positions in one of which the said load engaging means may be positioned immediately above the ground engaging means.

2. In a material handling machine having a horizontally disposed frame portion, a transverse axle connected to and supporting the frame and ground engaging means at the outer ends of the axle, a support member pivotally mounted on the frame closely adjacent the axle, the said support member comprising boom arm means extending outwardly and support arm means extending outwardly at an angle to the said boom arms and terminating adjacent the outer periphery of the ground engaging means, load engaging means pivotally mounted on the outer ends of said boom arm means and adapted to be pivoted between one extreme operating position in which a portion of the said load engaging means abuts the ends of the said support arm means and another operating position, first power means connected between said support member and the said load engaging means for pivoting the load engaging means selectively between the said two positions, and second power means connected between the said support member and the frame for moving the said support member selectively between two operating positions in one of which the said load engaging means may be positioned immediately over the ground engaging means.

3. In a material handling machine having a horizontally disposed frame portion, a transverse axle connected to and supporting the frame and ground engaging means at the outer ends of the axle, a grapple support member pivotally mounted on the frame closely adjacent the axle, the said grapple support member comprising a pair of boom arms extending outwardly past the outer periphery of the ground engaging means and terminating closely adjacent thereto and support arm means extending outwardly at an angle to the said boom arms and terminating adjacent the outer periphery of the ground engaging means, a grapple structure pivotally mounted at the outer ends of the said boom arms and adapted to be pivoted between a first extreme operating position in which a portion of the said grapple structure abuts the ends of the said support arms and another operating position, first power means connected between said grapple support member and the said grapple structure for pivoting the grapple structure selectively between the said two positions, and second power means connected between the said grapple support member and the frame for moving the grapple support member selectively between a first operating position in which the grapple support member is substantially above the axle and another operating position, whereby the said grapple structure is located over and closely adjacent the ground engaging means when the grapple structure and the said grapple support means are in their said first operating positions.

4. In a material handling machine having a horizontally disposed frame portion, a transverse axle connected to and supporting the frame and ground engaging wheels at the outer ends of the axle, a grapple support member pivotally mounted on the frame immediately behind and below the axle, the said grapple support member comprising a pair of boom arms extending outwardly and terminating closely adjacent the outer periphery of the wheels, a transverse brace member connecting said boom arms and a pair of support arms connected to said connecting member and extending outwardly at an angle to the said boom arms, said support arms terminating closely adjacent the outer periphery of the ground engaging means, a grapple structure pivotally mounted at the outer ends of the said boom arms and adapted to be pivoted between one extreme position in which a portion of the said grapple structure abuts the ends of the said support arm means and another position, first power means connected between said grapple support member and the said grapple structure for pivoting the grapple structure selectively between the said two positions, and second power means connected between the said grapple support member and the frame for moving the grapple support member selectively between two operating positions in one of which the said grapple structure may be positioned over the wheels.

5. In a material handling machine having a horizontally disposed frame portion, a transverse axle connected to and supporting the frame and ground engaging wheels at the outer ends of the axle, a grapple support member pivotally mounted on the frame immediately rearwardly and below the axle for movement between a first position rearwardly of the axle and a second position immediately over the axle, the said grapple support member comprising a pair of transversely spaced boom arms pivotally mounted on the frame and extending outwardly therefrom a short distance beyond the outer periphery of the ground engaging wheels, a transverse brace member disposed between the said boom arms and joined thereto, and a pair of transversely spaced support arms fixedly attached to said brace member inwardly of said boom arms and extending outwardly therefrom at an angle to the said boom arms, said support arms terminating closely adjacent the outer periphery of the ground engaging wheels, a grapple structure pivotally mounted at the outer ends of the said boom arms and adapted to be pivoted between one extreme position and another position in which a portion of the said grapple structure abuts the ends of the said support arms and is located immediately over the wheels when the grapple support member is in its second position, said grapple structure comprising a first pair of transversely spaced gripper arms and a second pair of transversely spaced gripper arms pivotally mounted on said first pair of gripper arms and coacting therewith to form load engaging means, first power means connected between said grapple support member and the said grapple structure for pivoting the grapple structure selectively between the said two positions, second power means connected between the said grapple support member and the frame for moving the grapple support member selectively between the said two operating positions thereof, and third power means connected between the said pairs of gripper arms for opening and closing the grapple structure.

6. A material handling machine comprising a horizontally disposed frame portion, a transverse axle attached to and supporting said frame, ground engaging wheels at the outer ends of said axle, a grapple support member pivotally mounted on said frame immediately rearwardly and below said axle, the said grapple support member comprising a pair of transversely spaced boom arms pivotally connected to the said frame adjacent the sides thereof respectively and extending outwardly therefrom toward the rear of the machine a short distance beyond the outer periphery of said ground engaging wheels, a transverse brace member disposed between the said boom arms and joined thereto, and a pair of transversely spaced generally L-shaped support arms fixedly attached to said brace member inwardly of said boom arms and extending generally upwardly and forwardly therefrom at an angle to the said boom arms, the said support arms terminating closely adjacent the outer periphery of the said ground engaging wheels, a first pair of piston and cylinder type hydraulic actuators connected between said grapple support member and said frame in longitudinal horizontally disposed relation having their forward ends pivotally attached to said frame forwardly of said axle and their rearward ends pivotally attached respectively to said support arms, said grapple support member being disposed rearwardly of the said frame when said first pair of actuators is extended and disposed upwardly of the frame when said first pair of actuators is retracted, a grapple structure pivotally mounted at the outer ends of the said boom arms comprising a first pair of transversely spaced generally U-shaped load arms forming a fork structure and a pair of transversely spaced gripper arms pivotally mounted at the tops respectively of the U-shaped load arms and coacting therewith to form a load retaining structure, a second pair of piston and cylinder hydraulic actuators connected between said grapple support member and said load arms, said grapple structure being disposed with the load arms thereof in abutment with the ends of said support arms when said second pair of actuators is retracted and pivoted rearwardly and downwardly away from the support arms when the second pair of actuators is extended, and a third pair of piston and cylinder hydraulic actuators pivotally connected between the said gripper arms and the said load arms for opening the grapple structure when the third pair of actuators is retracted and closing the grapple structure when the third pair of actuators is extended, whereby when the first and second pairs of actuators are extended and the third pair of actuators is retracted a loading position is provided in which the said grapple is open and extended rearwardly from the machine and when the first and second pairs of actuators are retracted and the third pair of actuators is extended a carrying position is provided in which the grapple structure is cradled over the axle and frame and when the first pair of actuators is retracted and the second and third pairs of actuators are extended a dumping position is provided.

References Cited in the file of this patent
UNITED STATES PATENTS

| | | |
|---|---|---|
| 2,418,251 | Drott | Apr. 1, 1947 |
| 2,745,565 | Johnson | May 15, 1956 |
| 2,754,016 | Anderson | July 10, 1956 |
| 2,958,434 | Wagner | Nov. 1, 1960 |
| 2,978,124 | Bernotas | Apr. 4, 1961 |
| 3,033,397 | Busch | May 8, 1962 |